United States Patent
Salahat et al.

(10) Patent No.: US 9,600,739 B2
(45) Date of Patent: Mar. 21, 2017

(54) ARCHITECTURE FOR REAL-TIME EXTRACTION OF EXTENDED MAXIMALLY STABLE EXTREMAL REGIONS (X-MSERS)

(71) Applicant: Khalifa University of Science, Technology and Research, Abu Dhabi (AE)

(72) Inventors: Ehab Najeh Salahat, Abu Dhabi (AE); Hani Hasan Mustafa Saleh, Abu Dhabi (AE); Andrzej Stefan Sluzek, Abu Dhabi (AE); Mohammed Ismail Elnaggar, Abu Dhabi (AE)

(73) Assignee: Khalifa University of Science, Technology & Research, Abu Dhabi (AE)

( * ) Notice: Subject to any disclaimer, the term of this patent is extended or adjusted under 35 U.S.C. 154(b) by 0 days.

(21) Appl. No.: 14/686,905

(22) Filed: Apr. 15, 2015

(65) Prior Publication Data

US 2016/0070975 A1 Mar. 10, 2016

Related U.S. Application Data

(63) Continuation-in-part of application No. 14/482,482, filed on Sep. 10, 2014, now Pat. No. 9,489,578, and (Continued)

(51) Int. Cl.
*G06K 9/46* (2006.01)
(52) U.S. Cl.
CPC ................. *G06K 9/4671* (2013.01)
(58) Field of Classification Search
CPC ......... G06K 9/4671; G06K 2009/4666; G06K 9/46; G06K 9/4661; G06K 9/52; G06T 7/20
(Continued)

(56) References Cited

U.S. PATENT DOCUMENTS 7,027,054 B1 4/2006 Cheiky et al.
7,725,484 B2 5/2010 Nistér et al.
(Continued)

OTHER PUBLICATIONS

Kristensen, et al. "Real-Time Extraction of Maximally Stable External Regions on and FPGA", IEEE, pp. 165-168, 2007.*
(Continued)

*Primary Examiner* — Daniel Mariam
(74) *Attorney, Agent, or Firm* — Withrow & Terranova, P.L.L.C.

(57) ABSTRACT

Architecture for real-time extraction of maximally stable extremal regions (MSERs) is disclosed. The architecture includes communication interface and processing circuitry that is adapted in hardware to receive a data streams of an intensity image and a depth image in real-time and provide intensity labels for image regions within the intensity image that match a given intensity threshold and provide depth labels for image regions within the depth image that match a given depth threshold. The processing circuitry is also adapted in hardware to find intensity extremal regions within the intensity image based upon the intensity labels and to find depth extremal regions within the depth image based upon the depth labels. The processing circuitry determines strong extremal regions based upon significant overlap between the intensity extremal regions and depth extremal regions. The processing circuitry then determines X-MSER ellipses parameters based upon the strong extremal regions and X-MSER criteria.

31 Claims, 6 Drawing Sheets

Related U.S. Application Data a continuation-in-part of application No. 14/482,629, filed on Sep. 10, 2014, now Pat. No. 9,311,555.

(58) Field of Classification Search
USPC ............. 382/103, 154, 190, 195, 203, 284
See application file for complete search history.

(56) References Cited

U.S. PATENT DOCUMENTS

| | | | |
|---|---|---|---|
| 7,813,561 B2 | 10/2010 | Jia et al. | |
| 8,265,866 B2 | 9/2012 | Altamura et al. | |
| 8,295,604 B2 | 10/2012 | Sakai et al. | |
| 8,406,532 B2 | 3/2013 | Wang et al. | |
| 8,538,077 B2 | 9/2013 | Zitnick, III | |
| 9,053,361 B2* | 6/2015 | Baheti | G06K 9/00456 |
| 2014/0212050 A1 | 7/2014 | Zhou et al. | |
| 2014/0286579 A1* | 9/2014 | Grujic | G06K 9/00986 |
| | | | 382/203 |

OTHER PUBLICATIONS

Zamberletti, Alessandro et al., "Text Localization based on Fast Feature Pyramids and Multi-resolution Maximally Stable Extremal Regions," ACCV 2014 Workshops Computer Vision, Springer International Publishing, 2014, pp. 91-105.

Notice of Allowance for U.S. Appl. No. 14/482,629, mailed Nov. 19, 2015, 8 pages.

Non-Final Office Action for U.S. Appl. No. 14/482,482, mailed Jan. 4, 2016, 7 pages.

Donoser, M., et al., "Efficient Maximally Stable Extremal Region (MSER) Tracking," Proceedings of the 2006 IEEE Computer Society Conference on Computer Vision and Pattern Recognition, Jun. 2006, 8 pages.

Donoser, M., et al., "Shape Guided Maximally Stable Extremal Region (MSER) Tracking," 20th International Conference on Pattern Recognition, Istanbul, Aug. 2010, pp. 1800-1803.

Greenhalgh, J., et al., "Real-Time Detection and Recognition of Road Traffic Signs," IEEE Transactions on Intelligent Transportation Systems, vol. 13, No. 4, Dec. 2012, pp. 1498-1506.

Hsu, G.-S., et al., "Application-Oriented License Plate Recognition," IEEE Transactions of Vehicular Technology, vol. 62, No. 2, Feb. 2013, pp. 552-561.

Huang, L., et al., "Human Skin Detection in Images by MSER Analysis," 18th IEEE International Conference on Image Processing, Brussels, Sep. 2011, pp. 1257-1260.

Riemenschneider, H., et al., "Online Object Recognition by MSER Trajectories," 19th International Conference on Pattern Recognition, Tampa, FL, Dec. 2008, 4 pages.

Sivic, J., et al., "Video Google: A Text Retrieval Approach to Object Matching in Videos," Proceedings of the Ninth IEEE International Conference on Computer Vision, Nice, France, Oct. 13-16, 2003, 8 pages.

Varah, S., et al., "Target Detection and Tracking Using a Parallel Implementation of Maximally Stable Extremal Region," GPU Technology Conference, Canada, Mar. 2013, 28 pages.

Non-Final Office Action for U.S. Appl. No. 15/277,477, mailed Nov. 3, 2016, 7 pages.

* cited by examiner

| SeedsList | Seed#1 | Seed#2 | Seed#3 | Seed#4 | BLANK |
|---|---|---|---|---|---|
| $\|Q(t-\Delta)\|$ | 25 | 49 | 102 | 4 | BLANK |
| $\|Q(t)\|$ | 120 | 120 | 135 | 11 | BLANK |
| $\|Q(t+\Delta)\|$ | 155 | 155 | 173 | 44 | BLANK |

| SeedsList | Seed#1 | Seed#2 | Seed#3 | Seed#4 | Seed#5 |
|---|---|---|---|---|---|
| $\|Q(t-\Delta)\|$ | 120 | 120 | 135 | 11 | 1 |
| $\|Q(t)\|$ | 155 | 155 | 173 | 44 | 1 |
| $\|Q(t+\Delta)\|$ | 203 | 203 | 244 | 244 | 13 |

ARCHITECTURE FOR REAL-TIME EXTRACTION OF EXTENDED MAXIMALLY STABLE EXTREMAL REGIONS (X-MSERS)

RELATED APPLICATIONS

The present application claims the benefit of and is a continuation in part of U.S. patent application Ser. No. 14/482,482, now U.S. Pat. No. 9,489,578, entitled "HARDWARE ARCHITECTURE FOR REAL-TIME EXTRACTION OF MAXIMALLY STABLE EXTREMAL REGIONS (MSERs)," filed on Sep. 10, 2014.

The present application claims the benefit of and is a continuation in part of U.S. patent application Ser. No. 14/482,629, now U.S. Pat. No. 9,311,555, entitled "ARCHITECTURE AND METHOD FOR REAL-TIME PARALLEL DETECTION AND EXTRACTION OF MAXIMALLY STABLE EXTREMAL REGIONS (MSERs)," filed on Sep. 10, 2014.

All of the applications listed above are hereby incorporated herein by reference in their entireties.

FIELD OF THE DISCLOSURE

The present disclosure relates to computer vision and automated surveillance systems.

BACKGROUND

Visual surveillance of dynamic scenes is an active area of research in robotics and computer vision. The research efforts are primarily directed towards object detection, recognition, and tracking from a video stream. Intelligent visual surveillance has a wide spectrum of promising governmental and commercial-oriented applications. Some important applications are in the field of security and include access control, crowd control, human detection and recognition, traffic analysis, detection of suspicious behaviors, vehicular tracking, Unmanned Aerial Vehicle (UAV) operation, and detection of military targets. Many other industrial applications in the automation fields also exist, such as faulty products detection, quality assurance, and production line control.

Commercial surveillance systems are intended to report unusual patterns of motion of pedestrians and vehicles in outdoor environments. These semiautomatic systems intend to assist, but not to replace, the end user. In addition, electronics companies provide suitable equipment for surveillance. Examples of such equipment include active smart cameras and omnidirectional cameras. All the above provide evidence of the growing interest in visual surveillance, whereas in many image processing applications, there is a crucial need for high performance real-time systems. A bottleneck in these systems is primarily hardware-related, including capability, scalability, requirements, power consumption, and ability to interface various video formats. In fact, the issue of memory overhead prevents many systems from achieving real-time performance, especially when general purpose processors are used. In these situations, typical solutions are either to scale down the resolution of the video frames or to inadequately process smaller regions of interests within the frame.

Although Digital Signal Processors (DSPs) provide improvement over general purpose processors due to the availability of optimized DSP libraries, DSPs still suffer from limited execution speeds. Thus, DSPs are insufficient for real-time applications. Field programmable gate array (FPGA) platforms, on the other hand, with their inherently parallel digital signal processing blocks, large numbers of embedded memory and registers, and high speed memory, together with storage interfaces, offer an attractive solution to facilitate hardware realization of many image detection and object recognition algorithms. As a result, computationally expensive algorithms are usually implemented on an FPGA.

State-of-the-art developments in computer vision confirm that processing algorithms will make a substantial contribution to video analysis in the near future. Processing algorithms, once commercialized, may overcome most of the issues associated with the power and memory-demanding needs. However, the challenge to devise, implement and deploy automatic systems using such algorithms to detect, track and interpret moving objects in real-time remains. The need for real-time applications is strongly felt worldwide, by private companies and governments directed to fight terrorism and crime, and to provide efficient management of public facilities.

Intelligent computer vision systems demand novel system architectures capable of integrating and combining computer vision algorithms into configurable, scalable, and transparent systems. Such systems inherently require high performance devices. However, many uncharted areas remain unaddressed. For example, only a single hardware implementation attempt has been reported for a Maximally Stable Extremal Regions (MSERs) detector and the attempt had limited success. This is in spite of the fact that MSER detectors were introduced as a research topic more than a decade ago, have been used in numerous software applications, and discussed in over 3,000 published papers. The major advantage of MSER detectors is affine invariance. Traditional scale invariant feature transform (SIFT) detectors and speeded up robust features (SURF) detectors are only scale and rotation invariant.

In spite of the major advantages of MSERs, a problem remains in tracking objects that pass through scenes of dramatic light intensity changes. For example, assume that a car is being tracked by a helicopter in a clear bright environment using a classical MSER tracking system. Once the car enters an area having a dramatic intensity change such as passing through a sunny area into a shady area, the classical MSER tracking system will very likely lose track of the car. This is because the classical MSER tracking system relies on intensity images that have a relatively stable light intensity to track objects.

What is needed is hardware architecture for real-time extraction of MSERs that can track objects through scenes having relatively large light intensity changes. Further still, the architecture should be easily realized with e.g., an FPGA or an application specific integrated circuit (ASIC) or the like.

SUMMARY

An architecture for real-time extraction of maximally stable extended extremal regions (X-MSERs) is disclosed. The architecture includes a communication interface and processing circuitry that are adapted in hardware to receive data streams of an intensity image and a depth image in real-time, and provide intensity labels for image regions within the intensity image that match a given intensity threshold, and provide depth labels for image regions within the depth image that match a given threshold. The processing circuitry is also adapted in hardware to find intensity extremal regions within the intensity image based upon the intensity labels and to find depth extremal regions within the depth image based upon the depth labels. The processing circuitry determines strong extremal regions based upon significant overlap between the intensity extremal regions and the depth extremal regions. The processing circuitry then determines X-MSER ellipses parameters based upon the strong extremal regions and X-MSER criteria.

In at least one embodiment, the X-MSER criteria include minimum X-MSER area, maximum X-MSER area, the acceptable growth rate value for X-MSER area, (i.e., maximum region area variation), and a threshold increment parameter (i.e., step size between consecutive threshold values). In another embodiment, the X-MSER criteria include a nested X-MSER tolerance value.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 1 is a block diagram of the proposed architecture for real-time extraction of extended maximally stable extremal regions (X-MSERs) that is in accordance with the present disclosure, which can be easily used in System-on-Chip (SoC) platforms or the like.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
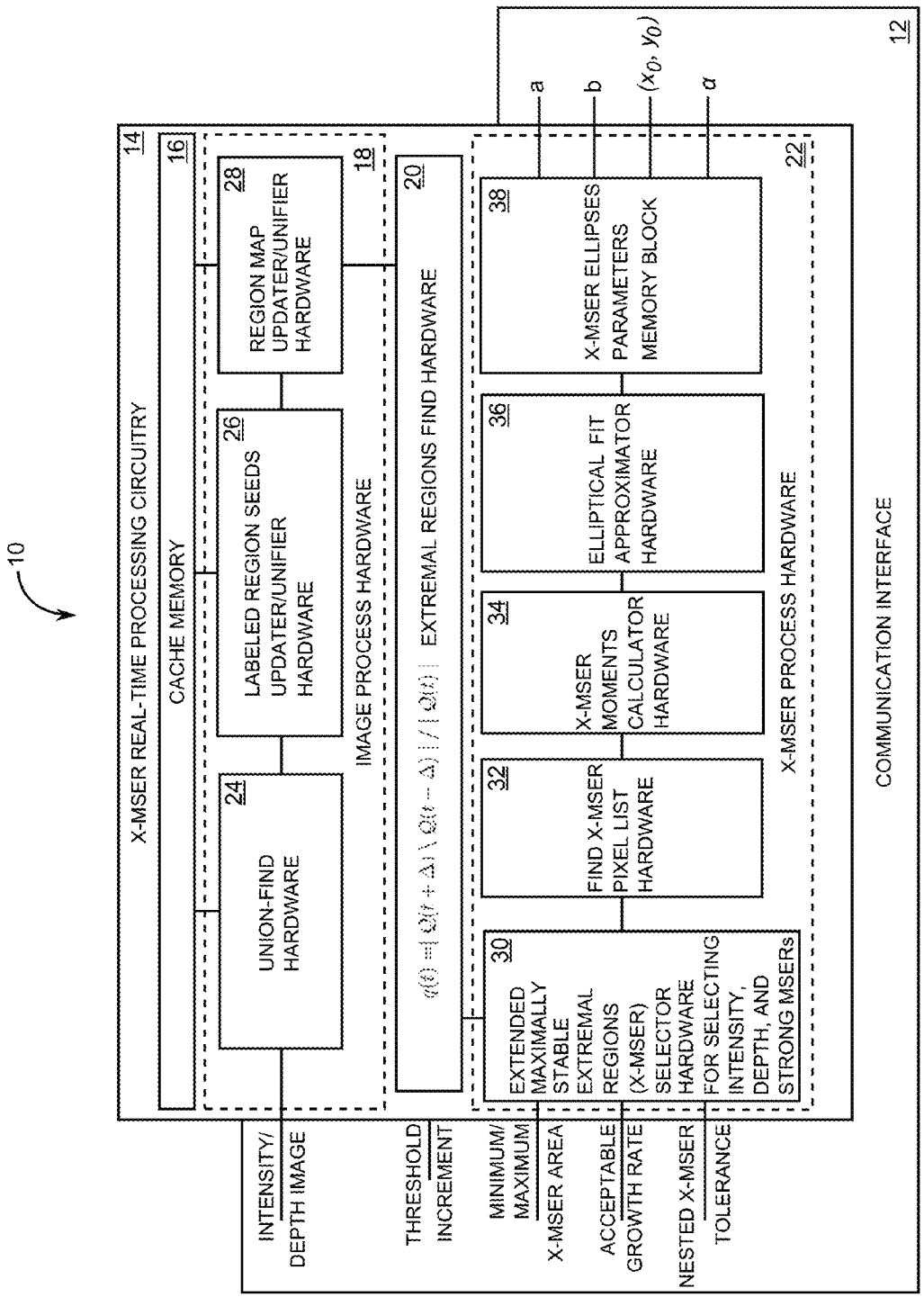

FIG. 1 is a block diagram of an architecture 10 for real-time extraction of extended maximally stable extremal regions (X-MSERs). The architecture 10 includes a communication interface 12 and X-MSER real-time processing circuitry 14. In an exemplary embodiment, a cache memory 16 is usable to store data resulting from X-MSER processing performed by the X-MSER real-time processing circuitry 14. For the purpose of this disclosure, the architecture combines the required electronic circuits of various hardware implemented functions and memory needed to realize the architecture 10 onto a single integrated chip (IC) and as a complete system. The architecture 10 platform can be realized on (System-on-Chip) SoCs, a field programmable gate array (FPGA), an application specific integrated circuit (ASIC) or the like.

The X-MSER real-time processing circuitry 14 includes image process hardware 18 that receives a data stream of an intensity image via the communications interface 12 and provides labels for image regions within the intensity image that match a given intensity threshold. The image process hardware 18 also receives a data stream of a depth image via the communications interface 12 and provides depth labels for image regions within the depth image that match a given depth threshold.

An image acquired by a digital camera inherently comprises intensity values that are related to scene radiance. The intensity values of the acquired image yields an intensity image that is usable with the present disclosure. On the other hand, various techniques and equipment are available for either capturing the depth image or deriving and/or estimating the depth image. One common passive method to produce the depth image is to use a pair of cameras to simultaneously capture two images of a scene from slightly different angles and then use the captured images to derive one depth image. Often, a depth map is used to assign a depth range to each pixel. An active method for capturing a depth image uses only one camera, but includes a projector that projects a pattern upon a scene being imaged. The pattern is distorted by objects within the scene at various ranges from the camera. A processor associated with the camera uses the distorted pattern to infer relative distances for each pixel in the image to derive a depth image that is usable as the depth image of the present disclosure. Exemplary camera equipment that is usable to produce both intensity images and depth images is made by Microsoft™ and sold under the name Kinect. Other active methods such as laser scanning are also available for producing the depth image. However, some passive methods and active methods are more suitable than others for producing depth images in real-time.

Also included is extremal regions find hardware 20 that finds intensity extremal regions within the intensity image based upon the intensity labels. The extremal regions find hardware 20 also finds depth extremal regions within the depth image based upon the depth levels. During operation for both the intensity image and the depth image processing, the extremal regions find hardware 20 automatically monitors the size of each extremal region, i.e., each extremal region's cardinality, $|Q(t)|$, as a function of a threshold value t, which is the given intensity threshold when finding intensity extremal regions and the given depth threshold when finding depth extremal regions. An MSER is detected if q(t) has a local minimum, where $$q(t)=|Q(t+\Delta)\backslash Q(t-\Delta)|/|Q(t)|. \qquad \text{EQ. 1}$$

Detected MSERs are further processed by X-MSER process hardware 22 to extract MSERs of particular interest. Details of the X-MSER process hardware 22 is discussed later in this disclosure.

In an exemplary embodiment, an incoming frame of the intensity image is intensity thresholded to generate an intensity binary image made up of dark pixels and bright pixels at full contrast. In an exemplary embodiment, the threshold value t starts at zero and increments at a given intensity threshold increment $\Delta$ until the intensity threshold value equals 255. Therefore, if $\Delta$ is set to 5, there will be 52 intensity thresholding processes per intensity image frame. Further still, with Δ increments, the threshold continues to increase until the entire intensity image is processed. In general, the thresholding process requires 255/Δ+1 threshold increments. Typical values of Δ range from around about 4 to around about 8. Therefore, around about 64 to around about 8 threshold increments are needed to process a complete intensity image. There is a binary image for each threshold increment, and light regions and dark regions are labeled for each threshold increment.

In similar fashion, an incoming frame of the depth image is depth thresholded to generate a depth binary image made up of dark pixels and bright pixels at full contrast. In an exemplary embodiment, the threshold value t starts at zero and increments at a given depth threshold increment Δ until the depth threshold value equals 255. Therefore, if Δ is set to 5, there will be 52 depth thresholding processes per depth image frame. Further still, with Δ increments, the threshold continues to increase until the entire depth image is processed. In general, the thresholding process requires 255/Δ+1 depth increments. Typical values of Δ range from around about 4 to around about 8. Therefore, around about 64 to around about 8 threshold increments are needed to process a complete depth image. There is a binary image for each depth increment, and light regions and dark regions are labeled for each depth increment.

In an exemplary embodiment, the image process hardware 18 includes union-find hardware 24 that labels image regions within the intensity image for each Δ of the threshold value t. It is to be understood that the union-find hardware 24 can be replaced with other labeling/segmentation algorithms hardware with some extra processing, i.e., a union-find algorithm is just an example of a useful algorithm that can be used with MSER detection. However, the union-find hardware 24 has proven to be particularly robust in conjuction with the other disclosed hardware in detecting X-MSERs.

In particular, the union-find hardware 24 labels regions within the binary image for each intensity threshold of the intensity image. Moreover, the union-find hardware 24 will provide a labeled image, a seed, and a size (i.e., the number of pixels with a same label) of each region plus the number of labels used. Simply put, the union-find hardware 24 provides labeled regions and their corresponding sizes and seeds. The seed of each region at a particular given value for the threshold t is the first pixel location that the union-find hardware 24 finds for the region. Due to the threshold increment A, previous regions may grow or merge and new regions may appear. As a result, the union-find hardware 24 will label such regions with labels that are still unique but not necessarily similar to previous labels or with the same seeds. Furthermore, because the regions can grow and/or merge, the first pixel location that the union-find hardware 24 encounters for a growing region will be different from a previous seed, even though both refer to the same region. To overcome this problematic issue, labeled region seeds updater/unifier hardware 26 compares all seeds stored as a seed list in the cache memory 16 for a present threshold to seeds previously detected and stored in the seed list. If a match between seeds is found, the original seed is maintained by the labeled region seeds updater/unifier hardware 26. Otherwise, the labeled region seeds updater/unifier hardware 26 appends a new seed to the seeds list stored in the cache memory 16.

A region map for each intensity image and depth image is usable to store region sizes for the seeds in the seeds list. The region map is stored as a dedicated portion of the cache memory 16. Region map updater/unifier hardware 28 updates each region map as the intensity image and depth image are processed by the union-find hardware 24.

The amount of memory that is needed to store the seeds' region sizes is 3 times the number of seeds stored in a SeedList memory because the region map stores the value of Q(t+Δ), Q(t), and Q(t−Δ) for each seed. These values are needed to calculate the stability function for each seed in the SeedList memory. The region map allows for memory reduction and efficiency in place of recording a region size for every seed in the SeedList memory at every threshold t. As a result, if more seeds are appended to the SeedList memory at threshold t+Δ, then new locations for this new seed are also appended to a RegionMap memory, where the region size for this threshold t is added in the q(t)=|Q(t+Δ)| while |Q(t)| and |Q(t−Δ)| are filled with ones to avoid division by zero. Note, that since |Q(t+Δ)| is not available at the current threshold t, nor is t available for the first threshold, then the calculation of q(t) starts at the third threshold, i.e., q(t) is calculated at threshold t+Δ, excluding the first and final threshold values. In this way, the Region-Map memory has three rows to allow the stability function to be easily calculated. To elaborate on this, consider the following sample scenario table shown in FIG. 2A. At the third threshold, in FIG. 2A, q(t) is calculated for the second threshold. At |Q(t)|, the two regions defined by Seed#1 and Seed#2 merge and have the same size from then on. At the fourth threshold, in FIG. 2B, q(t) is calculated for the third threshold, and note that |Q(t+Δ)| and |Q(t)| at the third threshold are |Q(t)| and |Q(t−Δ)| at the fourth threshold. As a result of the detection of a new region, defined by Seed#5, the RegionMap memory is appended and the size of this new region at |Q(t+Δ)| is filled with its size, while |Q(t)| and |Q(t−Δ)| are filled with ones. At the final threshold, regions referred to by Seed#3 and Seed#4 merge so they will have the same region size from now on, etc. Note that at the final threshold, all regions will merge into one with a size M×N.

The communication interface 12 receives X-MSER criteria that in at least one embodiment includes a minimum X-MSER area value MinArea, a maximum X-MSER area value MaxArea, and an acceptable growth rate value Max-Growth. The minimum X-MSER area is the minimum number of pixels that an X-MSER can contain. In contrast, the maximum X-MSER area is the maximum number of pixels that an X-MSER can contain. As such, all detected X-MSERs must satisfy the condition:

$$\text{MinArea} \leq Q \leq \text{MaxArea}. \qquad \text{EQ. 2}$$

The communication interface 12 passes the X-MSER criteria to X-MSER selector hardware 30, which also receives X-MSERs found via the extremal regions find hardware 20. The X-MSER selector hardware 30 in turn tests each MSER to ensure that each X-MSER has an area that fits within the range specified by the minimum X-MSER area value MinArea and the maximum X-MSER area value MaxArea.

The maximum acceptable growth rate value MaxGrowth specifies how stable the detected X-MSERs must be. In particular, all detected MSERs must satisfy the condition:

$$q(t)=|Q(t+\Delta)\backslash Q(t-\Delta)|/|Q(t)|\leq \text{MaxGrowth}. \qquad \text{EQ. 3}$$

The communication interface 12 passes maximum acceptable growth rate value MaxGrowth to the X-MSER selector hardware 30, which in turn tests each MSER found by the extremal regions find hardware 20 to ensure that each MSER does not exceed the maximum acceptable growth rate value MaxGrowth.

In one embodiment, the X-MSER criteria also include a nested X-MSER tolerance value τ that is provided to mitigate sensitivity to blur and to mitigate discretization effects that negatively impact traditional MSER extraction software and/or hardware. Since nested MSERs have similar center coordinates, any new MSERs with centers within a range associated with the tolerance value τ compared to previously detected and stored MSERs, are excluded automatically. In particular, all detected MSERs satisfy the following conditions:

$$x_0 \notin \{(1-0.5\tau)x_i, (1+0.5\tau)x_i\}, \quad \text{EQ. 4}$$

$$y_0 \notin \{(1-0.5\tau)y_i, (1+0.5\tau)y_i\}, \quad \text{EQ. 5}$$

where $x_i$ and $y_i$ denote all previously stored center values of the detected MSERs. However, comparing centers has a drawback in that unnecessary computations are included while image moments are calculated. In order to predict possible nesting, and hence save unnecessary operations due to comparing centers, an alternative approach is executed by the X-MSER selector hardware 30 at a relatively far lower computational cost. Specifically, for each region, the X-MSER selector hardware 30 compares a current growth rate with a previous growth rate, and if an absolute difference is within a range defined by the tolerance value τ, then this region at the current intensity threshold is excluded by the X-MSER selector hardware 30 from further MSER extraction processing. Moreover, an exemplary threshold increment, Δ, may be selected as 5 to speed up the MSER detection process. MSER detection with Δ equal to 5 is around about five times faster than MSER detection with Δ equal to 1. Further still, since merged regions will have the same growth rate from the intensity threshold level as they merge, only one MSER that corresponds to the region with a seed that comes first in the seed list will be detected. The remaining MSERs will not be processed, but instead will be ignored. As a result of ignoring the remaining MSERs, many other unnecessary computations are eliminated to further save energy and execution time.

After the intensity image and the depth image have been processed to find the intensity extremal regions and the depth extremal regions, the X-MSER selector hardware 30 determines strong extremal regions based upon significant overlap between the intensity extremal regions and the depth extremal regions. Significant overlap in accordance with the present disclosure ranges from around 70% to around 100% of total combined area for the intensity extremal regions and the depth extremal regions. Alternatively, the ellipses parameters can be compared instead and those parameters that are very similar indicate an overlapped strong MSER. Next, the X-MSER process hardware 22 determines X-MSER ellipses parameters based upon the strong extremal regions and X-MSER criteria. The X-MSER ellipses represent strong MSERs that are robust and that can track objects through scenes having relatively large light intensity changes. X-MSER ellipses parameters for the strong MSERs that represent the center of the X-MSER ellipse, the major axis length, the minor axis length, and the angle of the major axis with respect to the horizontal axis are output through the communications interface 12 to external equipment (not shown). The remaining disclosure details operations that are common to processing both an intensity image and a depth image.

In this regard, find X-MSER pixel list hardware 32 generates a pixel list for the x and y coordinates for each labeled region defined by the labeled regions seed stored in the SeedList memory for every intensity MSER and depth MSER that passes the conditions tested by the X-MSER selector hardware 30. X-MSER moments calculator hardware 34 uses the pixel list to calculate region moments using the following relationship for any particular moment $m_{pq}$.

$$m_{pq} = \Sigma_{(x,y) \in R} x^p y^q, \quad \text{EQ. 6}$$

$$x, y \in R(\tau) \quad \text{EQ. 7}$$

where x and y denote the pixel coordinates of the region R(τ) at the current intensity threshold. Subsequently, the region can be approximated by a best-fit ellipse equation that is given by:

$$\frac{(x - x_0 + \tan(\alpha)(y - y_0))^2}{a^2(1 + \tan^2(\alpha))} + \frac{(y - y_0 + \tan(\alpha)(x - x_0))^2}{b^2(1 + \tan^2(\alpha))} = 1 \quad \text{EQ. 8}$$

where $(x_0, y_0)$, a, b, and α, respectively, are X-MSER ellipses parameters that represent a center of gravity (center of the X-MSER ellipse), a major axis length, a minor axis length, and an angle of the major axis with respect to a horizontal axis. In an exemplary embodiment, the X-MSER ellipses parameters are determinable using region moments $m_{00}$, $m_{10}$, $m_{10}$, $m_{11}$, $m_{02}$, and $m_{20}$ that are calculated by X-MSER moments calculator hardware 34. Elliptical fit approximator hardware 36 uses the region moments provided by the X-MSER moments calculator hardware 34 to approximate the X-MSER ellipses parameters $(x_0, y_0)$, a, b, and α via the following mathematical relationships.

$$x_0 = \frac{m_{10}}{m_{00}}, \quad \text{EQ. 9}$$

$$y_0 = \frac{m_{01}}{m_{00}}, \quad \text{EQ. 10}$$

$$a = \sqrt{2\left(t_1 + t_3 + \sqrt{t_2^2 + (t_3 - t_1)^2}\right)}, \quad \text{EQ. 11}$$

$$b = \sqrt{2\left(t_1 + t_3 - \sqrt{t_2^2 + (t_3 - t_1)^2}\right)}, \quad \text{EQ. 12}$$

$$\alpha = 0.5 \tan^{-1}\left(\frac{t_2}{t_1 - t_3}\right), \quad \text{EQ. 13}$$

where $$t_1 = \frac{m_{20}}{m_{00}} - x_0^2, \quad \text{EQ. 14}$$

$$t_2 = 2\left(\frac{m_{11}}{m_{00}} - x_0 y_0\right), \quad \text{EQ. 15}$$

$$t_3 = \frac{m_{02}}{m_{00}} - y_0^2, \quad \text{EQ. 16}$$

Instead of storing each MSER pixels list, which would require a relatively huge memory, an X-MSER ellipses parameters memory block 38 is usable to store best-fit ellipses parameters $(x_0, y_0)$, a, b, and α, which are provided to external hardware (not shown) for display or monitoring. For example, since the best-fit ellipses parameters $(x_0, y_0)$, a, b, and α are readily available through the communication interface 12, they can be used to compute scale invariant feature transform (SIFT) descriptors and speeded up robust features (SURF) descriptors. Depending on whether or not the intensity image is inverted, the architecture 10 will detect and extract either bright or dark MSERs.

Figures 2A, 2B, 3:
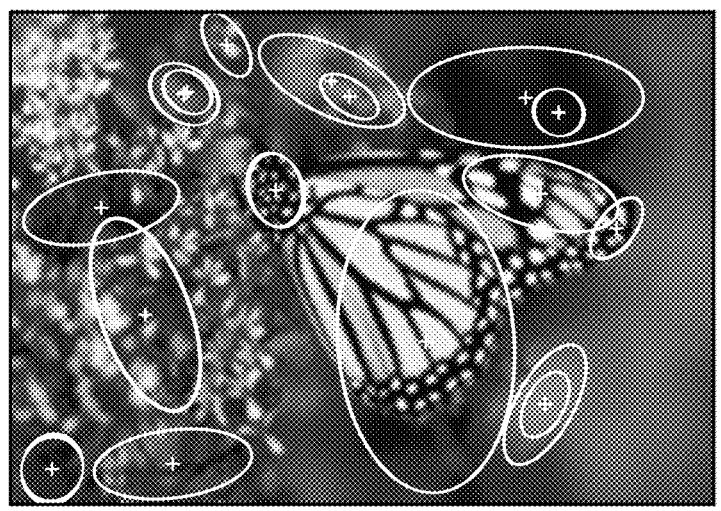
FIG. 2A is a sample scenario table for a seed list at a third intensity threshold or depth threshold.
FIG. 2B is an updated sample scenario table for the seed list at a fourth intensity threshold or depth threshold.
FIG. 3 is a test intensity image displaying ellipses for X-MSERs detected and extracted from the test intensity image.

FIG. 3 is a test intensity image displaying a sample of MSERs that were detected by the architecture 10 of the present disclosure. The MSERs are contained or mostly contained within the white ellipses. Note that some of the MSERs are nested and are represented by ellipses within other ellipses.

Crosshairs designate the center of each ellipse. Some nested MSERs are represented by concentric ellipses. It is to be understood that the number of ellipses representing MSERs in FIG. 3 are relatively few only for the purpose of simplified illustration. Relatively many more MSERs are typically detectable during operation of the architecture 10.

Figure 4:
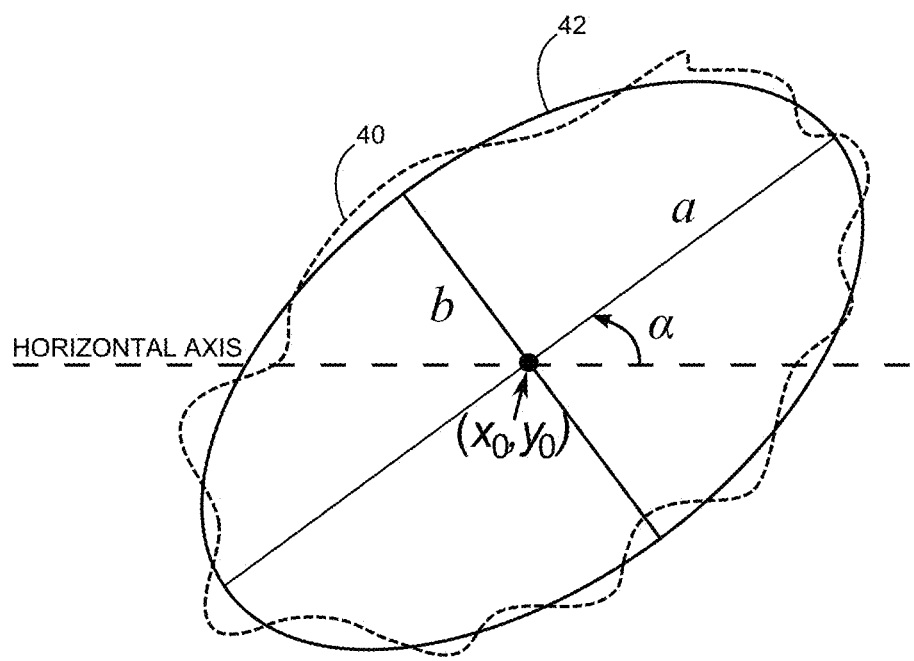
FIG. 4 is an exemplary contour sketch of an irregularly-shaped X-MSER with a best-fit elliptical approximation.

FIG. 4 is an exemplary contour sketch of an irregularly shaped MSER 40 with a best-fit elliptical approximation 42. Note that since merging regions will cause the same region sizes to be stored for multiple seeds, multiple detections referring to the same MSER may occur. To avoid this, only the first seed for each merged region is used by the MSER process hardware 22 during operation, as discussed above.

Figure 5:
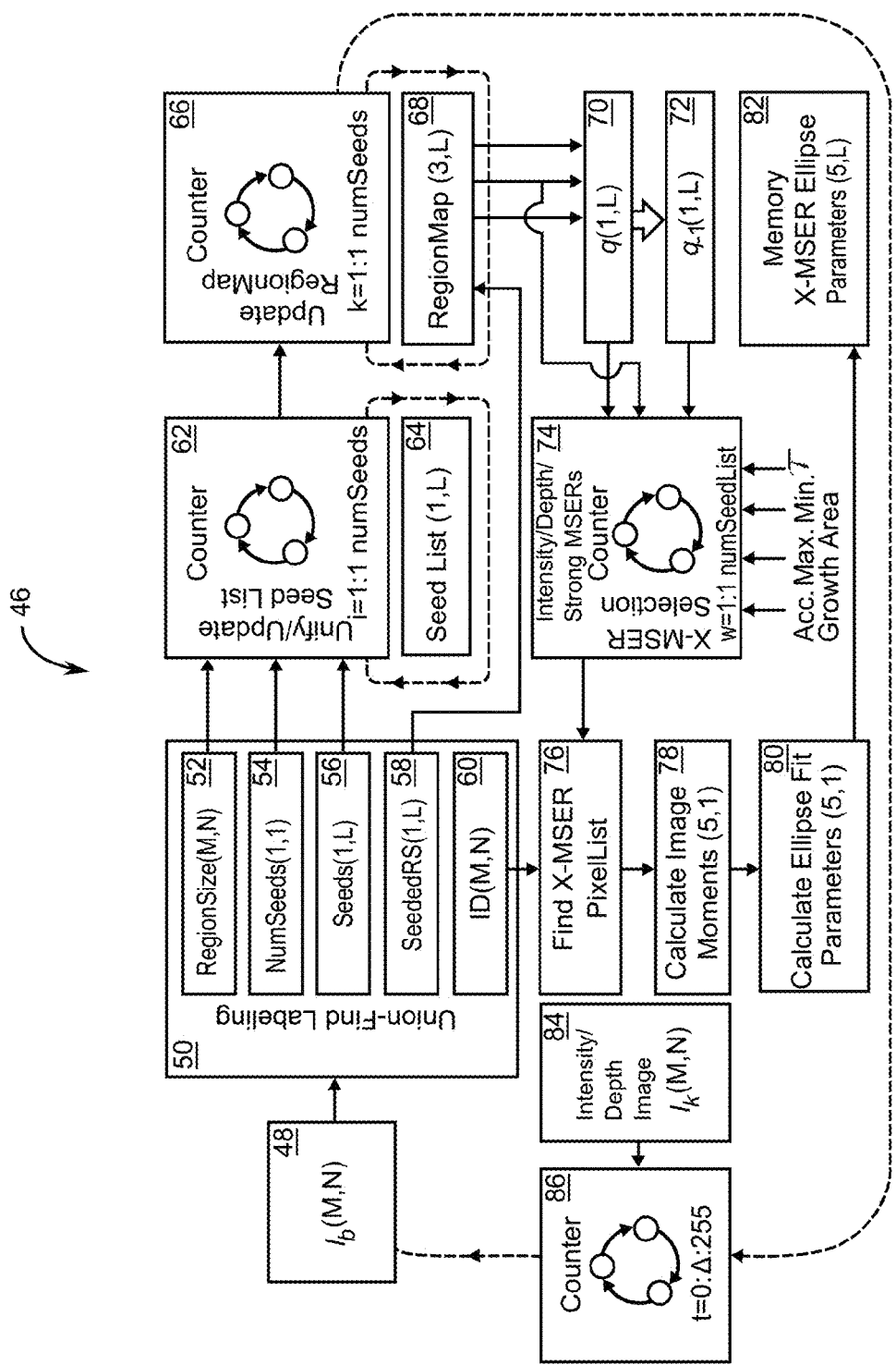
FIG. 5 is a diagram for a process flow for the X-MSER processing hardware of FIG. 1.

FIG. 5 is a diagram for a process flow 46 for the MSER real-time processing circuitry 14 (FIG. 1). Note that dashed lines represent loop operations. The MSER real-time processing circuitry 14 reserves a memory block 48 having M rows and N columns to store an M×N binary (i.e., intensity threshold) image derived for the intensity image. A union-find labeling process 50 that generates a region size array 52, a number of seeds variable 54, a list of seeds 56, a seeded region size list 58 that includes the seed and the size (i.e., the number of pixels with the same label) of each region, and a labeled image array 60.

The labeled region seeds updater/unifier hardware 26 (FIG. 1) implements a finite state machine (FSM) 62, that is labeled in FIG. 5 as Unify/Update Seed List, that monitors the labels of regions to relate them according to their previous label values in order to maintain tracking of the same region's seeds and sizes to ensure proper MSER detection. If the current intensity threshold includes a region that has a different seed from the previous intensity threshold value, the previous seed is maintained; otherwise a new seed is appended to a seed list 64 by FSM 62.

The region map updater/unifier hardware 28 (FIG. 1) implements an update region map FSM 66 that is labeled in FIG. 5 as Update RegionMap. After unifying and updating the seed list 64, the FSM 66 maps the number of pixels in a region of each monitored region having a seed stored in the seed list 64. The mapping performed by the FSM 66 results in a region map array 68 that is, in this exemplary embodiment, named RegionMap (3, L). The region map array 68 is a 3×L array stored in cache memory 16.

In this exemplary embodiment, the region map array 68 stores the region size of each region having a seed in the seed list 64 for the current intensity threshold value and the previous two intensity threshold values. This is sufficient to calculate the growth rate or stability function of each region that is used to identify MSERs. Note that the stability function is defined as:

$$q(t)=|Q(t+\Delta)\backslash Q(t-\Delta)|/|Q(t)| \qquad \text{EQ. 17}$$

and Q(t+Δ), Q(t), and Q(t−Δ) are stored for every seeded region in the region map array 68. A q(t) memory array 70 is usable to store the results of the stability function at the current intensity threshold. A q(t−Δ) memory array 72 is usable to store the results of the stability function at the current intensity threshold minus Δ.

The X-MSER selector hardware 30 (FIG. 1) implements an X-MSER selection FSM 74 that performs selection of MSERs based on the values stored in the q(t) memory array 70 and q(t−Δ) memory array 72, along with X-MSER criteria received via the communications interface 12 (FIG. 1). The X-MSER criteria pertaining to the minimum X-MSER area value MinArea and the maximum X-MSER area value MaxArea are used by the X-MSER selection FSM 74 to exclude relatively too small MSERs and to exclude relatively too large MSERs. All MSERs Q detected by the X-MSER selection FSM 74 satisfy the following relationship:

$$\text{MinArea} \leq Q \leq \text{MaxArea} \qquad \text{EQ. 18}$$

The X-MSER selection FSM 74 uses the third parameter that pertains to the maximum acceptable growth rate value MaxGrowth to monitor the stability of the detected MSERs, which must satisfy the following relationship:

$$q(t)=|Q(t+\Delta)\backslash Q(t-\Delta)|/|Q(t)| \leq \text{AccGrth} \qquad \text{EQ. 19}$$

Moreover, the X-MSER selection FSM 74 compares the growth rate of q(t) and q(t−1). If the comparison does not exceed the nested MSER tolerance value τ then a nested MSER is detected and the X-MSER selection FSM 74 will not detect that particular nested MSER again.

The find X-MSER pixel list hardware 32 implements a find X-MSER pixel list function 76 that scans the binary image to locate all pixels belonging to each MSER detected. Afterwards, the X-MSER moments calculator hardware 34 implements a calculate image moments function 78 that calculates the region moments $m_{00}$, $m_{10}$, $m_{10}$, $m_{11}$, $m_{02}$, and $m_{20}$ that are stored in a 5×1 memory array stored in the cache memory 16 (FIG. 1). Next, the elliptical fit approximator hardware 36 implements a calculate ellipses fit parameters function 80 that calculates the best-fit ellipses parameters ($x_0$, $y_0$), a, b, and α, which are stored in the X-MSER ellipses parameters memory block 38 via a memory X-MSER parameters store parameters function 82. The MSER parameters are stored using a 5×L memory array.

An intensity image and depth image store function implemented by the X-MSER real-time processing circuitry 14 allocates a memory array $I_k(M,N)$ 84 within the cache memory 16. The X-MSER real-time processing circuitry 14 also implements an FSM 86 that uses values from the memory array $I_k(M,N)$ 84 to perform an intensity thresholding of the intensity image at every intensity threshold encountered for each intensity threshold increment Δ, and to perform a depth thresholding of the depth image at every depth threshold encountered for each depth threshold increment Δ.

Figure 6:
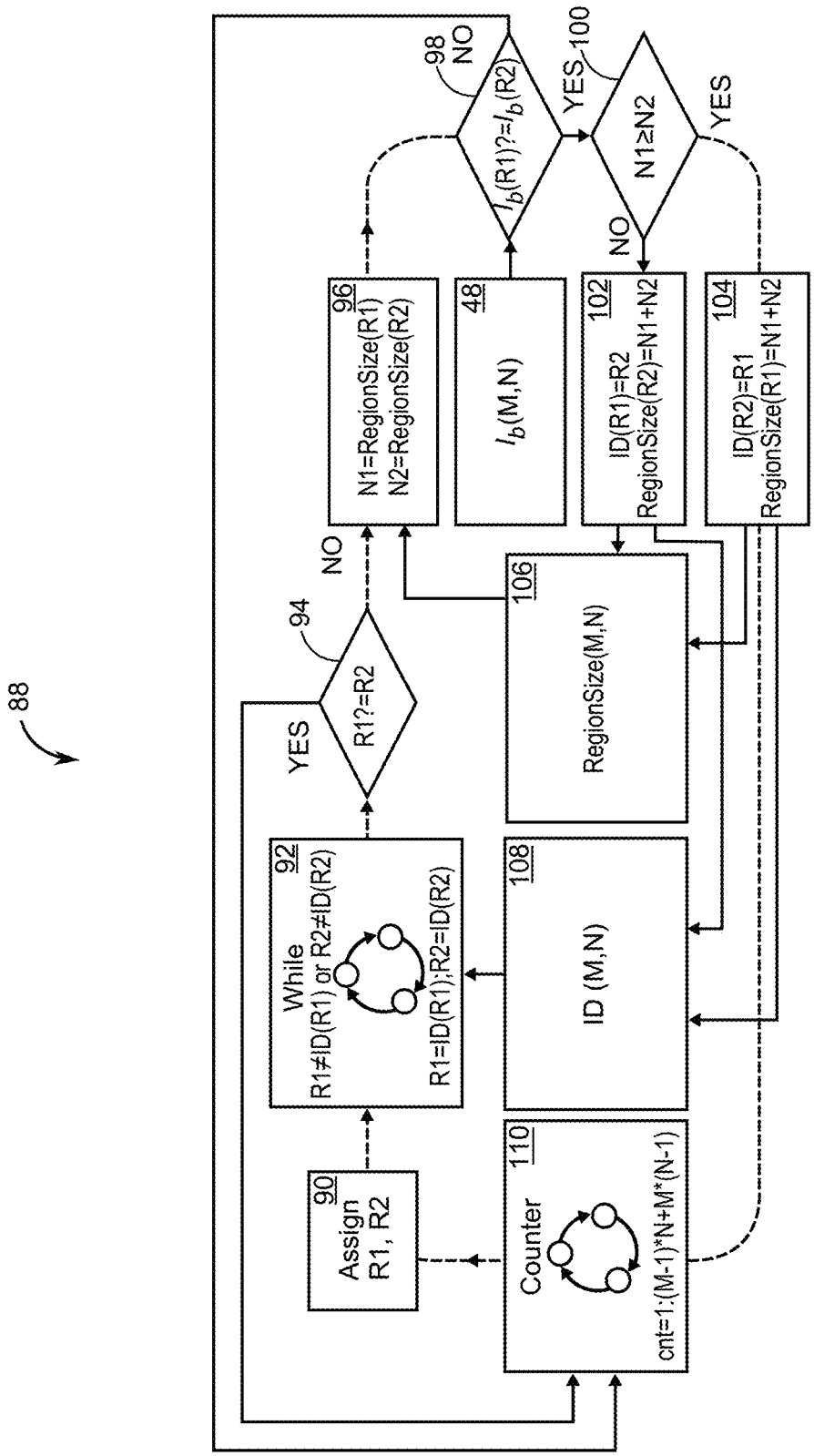
FIG. 6 is a diagram for a process flow for the union-find processing hardware of FIG. 1.

FIG. 6 is a process flow 88 for the union-find hardware 24 (FIG. 1). Note that dashed lines represent loop operations. In particular, the union-find hardware 24 implements an assign function 90 that assigns two relatively well-defined values for a pair of region roots (R1, R2) needed for the union-find labeling in accordance with the present disclosure. Note that the region roots (R1, R2) address two adjacent pixel identification (ID) memory addresses.

A first union-find FSM 92 compares the assigned region roots (R1, R2) to stored values at ID memory addresses. The first union-find FSM 92 makes the region roots (R1, R2) the same if the first union-find FSM 92 determines that the region roots (R1, R2) are different. As the first union-find FSM 92 operates, yet another comparison is made by a first decision diamond 94 to test whether the region roots (R1, R2) are the same. If the region roots (R1, R2) are not the same, the process continues with an assignment function 96 that assigns two variables (N1, N2) with two values respectively, with the stored values at the ID memory addresses for region roots (R1, R2) that correspond to the region size of a collective region defined by the region roots (R1, R2).

A second decision diamond 98 compares two adjacent pixels specified by the region roots (R1, R2) to determine whether the two adjacent pixels have the same value. If the region roots (R1, R2) are not the same, then there is no change. However, if the region roots (R1, R2) are the same, then the two adjacent pixels are connected and the process continues to a third decision diamond 100 that tests to see whether N1 is greater than or equal to N2. If N1 is not greater than or equal to N2, the process continues with a first merge block 102 that merges N1 and N2 into the region R2, which is relatively larger than region R1. If N1 is greater than or equal to N2, the process continues with a second merge block 104 that merges N1 and N2 into the region R1. The first merge block 102 and the second merge block 104 communicate with a region size memory array 106 that has M×N elements and is named RegionSize (M,N) in the exemplary embodiment of FIG. 6. A uniquely labeled image is stored within an ID matrix 108. Labels in the ID matrix 108 are unique and each label reflects the root of the associated region. In other words, since each region has just one root, each label is unique.

A region roots assignment FSM 110 continues assigning values for the region roots (R1, R2) and continues operating for every intensity threshold until all pixels are labeled. Each root (i.e. each of R1 and R2) is assigned M*(N−1)+N*(M−1) times.

A total memory requirement for a frame of M×N and a maximum number of L detected MSERs, the memory requirement can be approximated as: Total Memory Requirement≈M×N [intensity image]+0.125×M×N [binary image, one bit per location is sufficient]+2×k×M×N [ID+RegionSize]+4×L [Seeds List+RegionMap]+5×L [elliptical parameters]+2×L [q(t) and q(t−1)]=[1.125+2×k]×M×N+11×L, where k is a constant that ensures proper assignment for both RegionSize and ID, not larger than 3 to support 4096×4096 image resolution, which is, again, far more than needed in practice.

The total memory requirement is an upper limit approximation that is recommended because of the impossibility to predict the number of MSERs in an image, since the number of MSERs is highly dependent on the content of the image.

The architecture 10 of FIG. 1 does not perform complex image operations such as filtering, smoothing, Fourier Transform, and the like. In particular, only addition and multiplication are used during processing of one embodiment of the architecture 10. The bulk of these operations mainly comes from image moments calculations to find the five best-fit ellipses parameters ($x_0$, $y_0$)a, b, and α of the elliptical fit approximation, plus the union-find labeling process 50 (FIG. 5). The remainder of the operations are mainly assignment and comparison operations such as those executed during an intensity thresholding of the intensity image into binary image.

Figure 7:
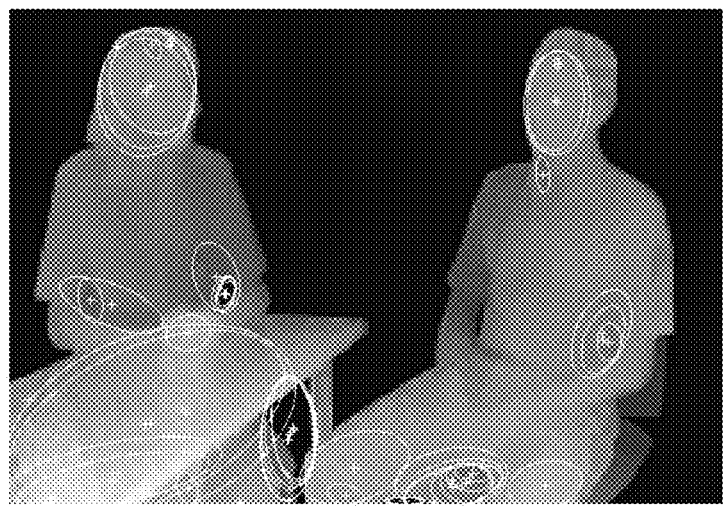
FIG. 7 is a test depth image with strong MSERs represented by X-MSER ellipses.

FIG. 7 is a test depth image with depth MSERs represented by MSER ellipses generated by the architecture 10. It is to be understood that the architecture 10 remains operational even if either the intensity image data stream or the depth image data stream is omitted. However, the inclusion of both the intensity image data stream and the depth image data stream results in relatively higher robustness in tracking objects in a dynamic light intensity scene. It is also to be understood that relatively few MSERs are represented in FIG. 7, and that the number of strong MSERs can be fewer or greater depending on a particular scene being processed.

Those skilled in the art will recognize improvements and modifications to the embodiments of the present disclosure. All such improvements and modifications are considered within the scope of the concepts disclosed herein and the claims that follow.

What is claimed is:

1. An architecture for real-time extraction of extended maximally stable extremal regions (X-MSERs) comprising a communication interface and processing circuitry arranged in hardware to in real-time:
   receive a data stream of an intensity image via the communication interface;
   receive a data stream of a depth image via the communication interface;
   find intensity extremal regions within the intensity image;
   find depth extremal regions within the depth image;
   determine strong extremal regions based upon significant overlap between the intensity extremal regions and the depth extremal regions; and
   determine X-MSER ellipses parameters based upon the strong extremal regions and X-MSER criteria.

2. The architecture of claim 1 wherein the X-MSER criteria include a nested X-MSER tolerance value.

3. The architecture of claim 2 wherein the X-MSER criteria further include a minimum X-MSER area, a maximum X-MSER area, and an acceptable growth rate value for X-MSER area.

4. The architecture of claim 1 wherein the X-MSER ellipses parameters include a center of gravity, a major axis length, a minor axis length, and an angle of the major axis length with respect to a horizontal axis.

5. The architecture of claim 1 wherein the processing circuitry includes X-MSER moments calculator hardware arranged to calculate X-MSER moments.

6. The architecture of claim 5 wherein the processing circuitry further includes elliptical fit approximator hardware adapted to receive X-MSER moments from the X-MSER moments calculator hardware and fit an X-MSER ellipse to an extremal region based upon the X-MSER moments.

7. The architecture of claim 1 wherein the processing circuitry includes union-find hardware arranged to provide intensity labels for image regions within the intensity image that match a given intensity threshold and arranged to provide depth labels for the image regions that match a given depth threshold.

8. The architecture of claim 7 wherein the processing circuitry includes extremal region find hardware that is arranged to receive the intensity labels and the depth labels for the image regions and find extremal regions based upon the intensity labels and the depth labels for the image regions.

9. The architecture of claim 8 wherein the extremal region find hardware is adapted to find extremal regions using a mathematical relationship $q(t)=|Q(t+\Delta)\backslash Q(t-\Delta)|/|Q(t)|$, wherein each extremal region's cardinality, $|Q(t)|$ is a function of an intensity threshold t that is the given intensity threshold to find intensity extremal regions and the given depth threshold to find depth extremal regions.

10. The architecture of claim 1 wherein the processing circuitry includes X-MSER selector hardware arranged to automatically select X-MSERs based upon the X-MSER criteria.

11. An architecture for real-time extraction of extended maximally stable extremal regions (X-MSERs) comprising:
   image process hardware arranged to receive a data stream of an intensity image and output intensity labels for image regions within the intensity image that match a given intensity threshold and to receive a data stream of a depth image and output depth labels for image regions within the depth image that match a given depth threshold;

extremal regions find hardware arranged to receive the intensity labels for the intensity image and find intensity extremal regions within the intensity image and to receive the depth labels for the depth image and find depth extremal regions within the depth image; and X-MSER process hardware arranged to determine strong extremal regions based upon significant overlap between the intensity extremal regions and the depth extremal regions and to receive X-MSER criteria and output X-MSER ellipses parameters based upon the strong extremal regions.

12. The architecture of claim 11 wherein the X-MSER criteria include a nested MSER tolerance value.

13. The architecture of claim 12 wherein the X-MSER criteria further include a minimum X-MSER area value, a maximum X-MSER area value, and an acceptable growth rate value for MSER areas.

14. The architecture of claim 11 wherein the X-MSER ellipses parameters include a center of gravity, a major axis length, a minor axis length, and an angle of the major axis length with respect to a horizontal axis.

15. The architecture of claim 11 wherein the image process hardware includes union-find hardware arranged to label region seeds.

16. The architecture of claim 11 wherein the image process hardware includes union-find hardware arranged to provide the intensity labels for the image regions within the intensity image that match a given intensity threshold and to provide the depth labels for the image regions within the intensity image that match a given depth threshold.

17. The architecture of claim 16 wherein the image process hardware further includes labeled region seeds updater/unifier hardware adapted to prevent a seed that is a first pixel location within the intensity image from being stored in a seed list, if the seed is presently stored in the seed list.

18. The architecture of claim 17 further including region map updater hardware arranged to store a value of $Q(t+\Delta)$, $Q(t)$, and $Q(t-\Delta)$ for each seed, where t is an intensity threshold and $\Delta$ is an increment of the intensity threshold t when processing an intensity image, and where t is a depth threshold and $\Delta$ is an increment of the depth threshold t when processing a depth image.

19. The architecture of claim 16 wherein the extremal regions find hardware is adapted arranged to find extremal regions using a mathematical relationship $(q(t)=|Q(t+\Delta)\setminus Q(t-\Delta)|/|Q(t)|$, where each extremal region's cardinality, $|Q(t)|$ is a function of an intensity threshold t that is the given intensity threshold to find intensity extremal regions and the given depth threshold to find depth extremal regions.

20. The architecture of claim 11 wherein the image process hardware, the extremal regions find hardware, and the X-MSER process hardware are fabricated on a single application specific integrated circuit (ASIC).

21. The architecture of claim 11 wherein the image process hardware, the extremal regions find hardware and the X-MSER process hardware are implemented on a single field programmable gate array (FPGA).

22. A method for real-time extraction of extended maximally stable extremal regions (X-MSERs) via processing circuitry comprising:

receiving a data stream of an intensity image via a communication interface in communication with the processing circuitry;

receiving a data stream of a depth image via the communication interface in communication with the processing circuitry;

generating intensity labels for image regions within the intensity image that match a given intensity threshold in real-time via the processing circuitry;

generating depth labels for the image regions within the depth image that match a given depth intensity threshold in real-time via the processing circuitry;

finding intensity extremal regions within the intensity image based upon the intensity labels in real-time via the processing circuitry;

finding depth extremal regions within the depth image based upon the depth labels in real-time via the processing circuitry;

determining strong extremal regions based upon significant overlap between the intensity extremal regions and the depth extremal regions; and determining X-MSER ellipses parameters based on the strong extremal regions and X-MSER criteria in real-time via the processing circuitry.

23. The method for real-time extraction of X-MSERs via the processing circuitry of claim 22 wherein the X-MSER criteria include a nested X-MSER tolerance value.

24. The method for real-time extraction of MSERs via the processing circuitry of claim 23 wherein the X-MSER criteria further include a minimum X-MSER area, a maximum X-MSER area, and an acceptable growth rate value for X-MSER areas.

25. The method for real-time extraction of MSERs via the processing circuitry of claim 22 wherein the X-MSER ellipses parameters include a center of gravity, a major axis length, a minor axis length, and an angle of the major axis length with respect to a horizontal axis.

26. The method for real-time extraction of X-MSERs via the processing circuitry of claim 22 wherein the processing circuitry includes X-MSER moments calculator hardware adapted to calculate X-MSER moments.

27. The method for real-time extraction of X-MSERs via the processing circuitry of claim 26 wherein the processing circuitry further includes elliptical fit approximator hardware adapted to receive X-MSER moments from the X-MSER moments calculator hardware and fit an X-MSER ellipse to an extremal region based upon the X-MSER moments.

28. The method for real-time extraction of X-MSERs via the processing circuitry of claim 22 wherein the processing circuitry includes union-find hardware adapted to provide the intensity labels for the image regions within the intensity image that match a given intensity threshold and to provide the depth labels for the image regions within the depth image that match a given depth threshold.

29. The method for real-time extraction of X-MSERs via the processing circuitry of claim 28 wherein the processing circuitry includes extremal region find hardware that is adapted to receive the intensity labels and depth labels for the image regions and find the strong extremal regions based upon the intensity labels and the depth labels for the image regions.

30. The method for real-time extraction of X-MSERs via the processing circuitry of claim 29 wherein the extremal region find hardware is adapted to find the extremal regions using a mathematical relationship $q(t)=|Q(t+\Delta)\setminus Q(t-\Delta)|/|Q(t)|$, where each extremal region's cardinality, $|Q(t)|$ is a function of an intensity threshold t that is the given intensity threshold to find the intensity extremal regions and the given depth threshold to find the depth extremal regions.

31. The method for real-time extraction of X-MSERs via the processing circuitry of claim 22 wherein the processing circuitry includes X-MSER selector hardware adapted to automatically select the X-MSERs based upon the X-MSER criteria.

* * * * *

UNITED STATES PATENT AND TRADEMARK OFFICE
CERTIFICATE OF CORRECTION

PATENT NO. : 9,600,739 B2  
APPLICATION NO. : 14/686905  
DATED : March 21, 2017  
INVENTOR(S) : Ehab Najeh Salahat et al.

Page 1 of 1

It is certified that error appears in the above-identified patent and that said Letters Patent is hereby corrected as shown below:

In the Specification

In Column 5, Line 48, replace "increment A" with --increment $\Delta$--.

In Column 11, Line 50, replace "parameters $(x_0, y_0)a$," with --parameters $(x_0, y_0)$, a,--.

In the Claims

In Column 13, Lines 46 and 48, Claim 18, replace "and $\Delta$is" with --and $\Delta$ is--.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*